United States Patent [19]

Zeitler et al.

[11] 3,998,912
[45] Dec. 21, 1976

[54] MANUFACTURE OF GRAFT COPOLYMERS

[75] Inventors: Gerhard Zeitler, Hessheim; Heinz Mueller-Tamm, Ludwigshafen; Friedrich Urban, Limburgerhof, all of Germany

[73] Assignee: BASF Aktiengesellschaft, Ludwigshafen (Rhine), Germany

[22] Filed: Oct. 6, 1975

[21] Appl. No.: 619,782

[30] Foreign Application Priority Data

Oct. 25, 1974   Germany .................. 2450672

[52] U.S. Cl. .................................. 260/878 R
[51] Int. Cl.² ............. C08F 263/04; C08F 265/02; C08F 265/04
[58] Field of Search ............................. 260/878 R

[56] References Cited
UNITED STATES PATENTS

| | | | |
|---|---|---|---|
| 3,808,294 | 4/1974 | Sato et al. ................ | 260/878 R |
| 3,886,234 | 5/1975 | Ishihara et al. ............ | 260/878 R |
| 3,949,012 | 4/1976 | Zeitler et al. ............. | 260/878 R |

FOREIGN PATENTS OR APPLICATIONS

| | | | |
|---|---|---|---|
| 2,253,245 | 5/1974 | Germany ................ | 260/878 R |

Primary Examiner—Alan Holler
Attorney, Agent, or Firm—Johnston, Keil, Thompson & Shurtleff

[57] ABSTRACT

Unsaturated carboxylic acids are grafted onto copolymers of ethylene and carboxylates. Carboxylic acid containing initiator is caused to diffuse into shaped elements of the copolymers, polymerization then being carried to completion by heating. The products exhibit no fish eyes and are highly suitable for sheet manufacture.

13 Claims, No Drawings

MANUFACTURE OF GRAFT COPOLYMERS

This invention relates to a process for the manufacture of graft copolymers by grafting unsaturated carboxylic acids onto copolymers of ethylene and unsaturated carboxylates.

Such graft copolymers provide molding compositions which contain carboxyl groups and are notable for particularly good adhesion properties.

There are only few methods of graft polymerization of water-soluble monomers such as unsaturated carboxylic acids. Polymerization in solution in inert solvents is economically unsatisfactory. One method which can be used industrially is graft polymerization in the melt. In this process, the copolymer is melted in a kneader or extruder and monomer containing initiator is fed to the melt. In another process, as described in German Published Application No. 1,720,256, the polymer is mixed with a free-radical initiator and the resulting mixture is reacted with a vinyl monomer in the molten state with stirring.

Molding compositions made by these methods have satisfactory properties for many applications, but they are not suitable for sheet manufacture. When the monomers are added to the melt, the high temperature involved causes accelerated polymerization of the monomer and the formation of homopolymer out of the added monomer. The resulting products are therefore inhomogeneous, since in addition to the graft copolymer they contain physically blended homopolymer. Such uneven mixtures are not suitable for the manufacture of sheeting, since the large number of fish eyes which are produced impairs the appearance of the sheeting. In some cases the preparation of the sheeting from such uneven compositions itself causes difficulty, since the fish eyes may develop into holes.

It is an object of the present invention to provide homogeneous graft copolymers not including any homopolymer.

This object is achieved, according to the invention, in the graft polymerization of unsaturated carboxylic acids to copolymers of ethylene and unsaturated carboxylates, by contacting shaped elements of the copolymers having diameters of from 0.05 to 1 cm with from 0.5 to 10%, by weight of the copolymer, of unsaturated carboxylic acids containing free-radical initiator in solution therein, in a mixing zone at from 10° to 30° C, allowing the initiator-containing carboxylic acid to diffuse into the copolymer and then polymerizing to completion with the exclusion of air at temperatures of from 50° to 100° C.

The shaped elements of the copolymers have maximum diameters of 1 cm and preferably have diameters of 0.1 to 0.5 cm. Particularly suitable shaped elements are, say, granules.

By copolymers of ethylene and unsaturated carboxylates we mean copolymers of ethylene and a vinyl ester of a $C_{2-3}$ alkanoic acid and/or a $C_{1-8}$ alkyl ester of a $C_{3-4}$ alkenoic acid, the copolymers containing at least 50% and not more than 97% by weight of polymerized units of ethylene. Particularly suitable are copolymers of ethylene with vinyl acetate, vinyl propionate or with butyl acrylate or butyl methacrylate. The melt index range of the copolymers used is between 0.5 and 300 g/10 min (190° C, 2.16 kg - ASTM D 1238–65 T).

By unsaturated polymerizable carboxylic acids we mean alkenoic acids or alkenedioic acids or alkenedioic anhydrides having from 2 to 8 carbon atoms. Preferred compounds are acrylic acid and methacrylic acid. The unsaturated carboxylic acids are used in amounts of from 0.5 to 10% and preferably from 1 to 5%, by weight of copolymer.

Initiation of the graft polymerization is effected using conventional free-radical initiators. Suitable initiators are peroxides, hydroperoxides and azo compounds which dissociate into free radicals, provided they have a decomposition temperature and a sufficiently long half-life below the softening point of the copolymer. Examples are dibenzoyl peroxide, dicaproyl peroxide, t-butylperoxy butyrate and 2,2-azodiisobutyronitrile. The initiators are generally used in an amount of from 0.002 to 0.5% by weight, based on the copolymer. They are dissolved in the monomeric unsaturated carboxylic acids and the solution is applied to the shaped elements of copolymer at room temperature.

The process of the invention is carried out by mixing the shaped elements of copolymers, e.g. granules, with the unsaturated carboxylic acids containing free radical initiators in a mixer at room temperature. The mixer may be a mixing drum or an impeller mixer.

The initiator-containing unsaturated carboxylic acids are repeatedly contacted with the copolymer in the mixing zone and can diffuse into the copolymer. By diffusion we mean substantially even dispersion of the unsaturated carboxylic acid and the initiator throughout the copolymer. To achieve this end it may be necessary for the residence time in the mixing zone at room temperature to be from 0.5 to 10 hours and preferably from 1 to 5 hours. The residence time during mixing depends on the amount of comonomer in the ethylene copolymer and on the amount of unsaturated carboxylic acid. If the proportion of comonomer is high, and the amount of carboxylic acid is low, the residence time may be short. The residence time should be sufficient to provide substantially homogeneous distribution of carboxylic acid and initiator throughout the ethylene copolymer. This is essential for the subsequent appearance of sheeting made from the graft copolymers.

When the mixture, e.g. the copolymer granules doped with acrylic acid, is then heated in a vessel with exclusion of air, the unsaturated carboxylic acid is grafted onto the copolymer. A suitable vessel is a stirred vessel, or, preferably, a tube. Heating may be effected by contact heating through the wall of the vessel or, say, by high frequency heating. The reaction may be carried out batchwise or continuously, e.g. by passing the granules treated with acrylic acid through a tube having a suitable reaction zone. The length of the raction zone depends on the temperature and on the half-life of the initiator. The temperature is such that graft polymerization proceeds as rapidly as possible but without the risk of the granules agglomerating due to the temperature rising to their softening point. The reaction temperatures used are from 50° to 100° C. It is best to use a temperature which is from 5° to 30° C below the softening point of the copolymer. This gives reaction times of from 0.5 to 10 hours. The degree of conversion, based on the unsaturated carboxylic acid used, is very good. Conversions of from 97 to 98% by weight are achieved.

The products prepared by the process of the invention exhibit no fish eyes and are highly suitable for the manufacture of sheeting.

In the following Examples the parts and percentages are by weight.

EXAMPLE 1

100 parts of a copolymer in the form of granules and consisting of 88 parts of ethylene and 12 parts of vinyl acetate and having a melt index (190° C, 2.16 kg - ASTM D 1238–65 T) of 6 g/10 min. and a softening point of 105° C were mixed for 15 minutes with 4 parts of acrylic acid softening 0.03 parts of dibenzoyl peroxide dissolved therein. Following a residence time of 2 hours at room temperature, the granules doped with acrylic acid were heated in a tube at 88° C with the exclusion of air and maintained at this temperature for 6 hours. After cooling, the product was found to have an acid number of 31. It was possible to make sheeting therefrom which showed no fish eyes.

EXAMPLE 2

100 parts of a copolymer in the form of granules and consisting of 80 parts of ethylene and 2 parts of n-butyl acrylate and having a melt index (190° C, 2.16 kg - ASTM D 1238–65 T) of 18 g/10 min. and a softening point of 102° C were mixed with 4 parts of acrylic acid containing 0.04 parts of dibenzoyl peroxide dissolved therein for 15 minutes. Following a residence time of 2 hours at room temperature, the granules doped with acrylic acid were heated at 80° C in a tube with the exclusion of air and maintained at this temperature for 5 hours. The product was found to have an acid number of 30.9 and could be readily processed to sheeting free from fish eyes.

EXAMPLE 3

100 parts of the copolymer described in Example 2 were doped with 4 parts of acrylic acid containing 0.02 part of 2,2-azodiisobutyronitrile dissolved therein and, after a residence time of 1 hour at room temperature, continuously fed to a tube with the exclusion of air. In the tube the product was heated at 80° C. The residence time in the tube was 4.5 hours. The conversion achieved was 93% based on acrylic acid. The product had an acid number of 28.8. It was possible to make sheeting therefrom which was free from fish eyes.

We claim:

1. A process for the manufacture of graft copolymers by grafting unsaturated carboxylic acids onto copolymers consisting of ethylene and unsaturated carboxylates in the presence of free-radical initiators, wherein shaped elements of the copolymers having diameters of from 0.05 to 1 cm are contacted in a mixing zone, at from 10° to 30° C, with from 0.5 to 10%, by weight of the copolymer, of unsaturated carboxylic acids containing free-radical initiator dissolved therein, whereupon the carboxylic acids containing initiator are allowed to diffuse into the copolymer and the mixture is then polymerized to completion at temperatures of from 50° to 100° C with the exclusion of air.

2. A process as claimed in claim 1, wherein the unsaturated carboxylic acids used are alkenoic acids having from 2 to 8 carbon atoms.

3. A process as claimed in claim 1, wherein the unsaturated carboxylic acids are alkenedioic acids of from 2 to 8 carbon atoms.

4. A process as claimed in claim 1, wherein the unsaturated carboxylic acids used are alkenedioic anhydrides of from 2 to 8 carbon atoms.

5. A process as claimed in claim 1, wherein the copolymers consist of ethylene and a vinyl ester of a $C_{2-3}$ alkanoic acid.

6. A process as claimed in claim 1, wherein the copolymers consist of ethylene and a $C_1$—$_{18}$ alkyl ester of a $C_3$—$_4$ alkenoic acid.

7. A process as claimed in claim 1, wherein the unsaturated carboxylic acid is acrylic acid.

8. A process as claimed in claim 1, wherein the copolymer is an ethylene-vinyl acetate copolymer.

9. A process as claimed in claim 1, wherein the copolymer is an ethylene-n-butyl acrylate copolymer.

10. A process as claimed in claim 1, wherein the shaped elements are granules.

11. A process as claimed in claim 1, wherein the free-radical initiator is a peroxide.

12. A process as claimed in claim 1, wherein the free-radical initiator is 2,2-azodiisobutyronitrile.

13. A process as claimed in claim 1, wherein diffusion of the carboxylic acid into the copolymer takes from 0.5 to 10 hours at room temperature.

* * * * *